United States Patent
Menonna et al.

(10) Patent No.: US 10,493,516 B2
(45) Date of Patent: *Dec. 3, 2019

(54) DEVICE FOR JOINTING A PLURALITY OF ELEMENTS ON A SHAFT

(71) Applicants: Mahle International GmbH, Stuttgart (DE); Maschinenbau-Service-Automatisierungstechnik Chemnitz GmbH, Chemnitz (DE)

(72) Inventors: Antonio Menonna, Ditzingen (DE); Stefan Morgenstern, Niederwiesa (DE); Roland Schacherer, Geisingen (DE)

(73) Assignees: MAHLE INTERNATIONAL GMBH (DE); MASCHINENBAU-SERVICE-AUTOMATISIERUNGSTECHNIK CHEMNITZ GMBH (DE)

( * ) Notice: Subject to any disclaimer, the term of this patent is extended or adjusted under 35 U.S.C. 154(b) by 249 days.

This patent is subject to a terminal disclaimer.

(21) Appl. No.: 15/334,919

(22) Filed: Oct. 26, 2016

(65) Prior Publication Data
US 2017/0113262 A1   Apr. 27, 2017

(30) Foreign Application Priority Data
Oct. 27, 2015   (DE) .......................... 10 2015 220 981

(51) Int. Cl.
*B23P 11/02* (2006.01)
*B21K 1/06* (2006.01)
(Continued)

(52) U.S. Cl.
CPC .............. *B21D 53/845* (2013.01); *B21K 1/06* (2013.01); *B23P 11/025* (2013.01); *F01L 1/047* (2013.01);
(Continued)

(58) Field of Classification Search
CPC . B23P 2700/02; B23P 2700/07; B23P 19/022; B23P 19/042; B23P 19/027;
(Continued)

(56) References Cited

U.S. PATENT DOCUMENTS

| 4,406,856 | A | * | 9/1983 | Wilkins | ................ B23P 19/022 165/76 |
| 4,835,832 | A | * | 6/1989 | Arnold | .................... F01L 1/047 29/445 |

(Continued)

FOREIGN PATENT DOCUMENTS

| CH | 709379 A1 | 9/2015 |
| DE | 102008064194 A1 | 7/2010 |

(Continued)

OTHER PUBLICATIONS

Translation of DE102008064194 (Year: 2010).*
(Continued)

*Primary Examiner* — Matthew P Travers
(74) *Attorney, Agent, or Firm* — Fishman Stewart PLLC

(57) ABSTRACT

A device for jointing a plurality of elements, each comprising a cutout for a shaft, in a predetermined angular position on the shaft, may include a traversable guide carriage configured to push the shaft from above through the cutouts of the elements. The device may also include an electrical spindle drive and a pneumatic piston for displacing the traversable guide carriage.

20 Claims, 2 Drawing Sheets

(51) Int. Cl.
*B23P 11/00* (2006.01)
*B23P 19/02* (2006.01)
*B21D 53/84* (2006.01)
*F01L 1/047* (2006.01)
*F16D 1/08* (2006.01)
*F16B 4/00* (2006.01)
*F16H 53/02* (2006.01)

(52) U.S. Cl.
CPC ............ *F16D 1/0858* (2013.01); *B23P 11/00* (2013.01); *B23P 19/02* (2013.01); *B23P 2700/02* (2013.01); *F01L 2001/0471* (2013.01); *F01L 2103/00* (2013.01); *F01L 2103/01* (2013.01); *F16B 4/006* (2013.01); *F16H 53/025* (2013.01)

(58) Field of Classification Search
CPC ......... B23P 11/025; B23P 11/02; B23P 19/02; B23P 19/04; Y10T 29/17; Y10T 29/49286; Y10T 29/49293; Y10T 29/49838; Y10T 29/53696; Y10T 29/5383; Y10T 29/53848; Y10T 29/49865; Y10T 29/53439; Y10T 29/49945; B21D 53/845; F16H 53/025; F16C 3/10; F16C 2226/12; F16C 2226/14; F01L 2001/0471; F01L 2103/01; F01L 1/047; F16D 1/0858; F15B 2015/206; B30B 1/007; B30B 1/32; B30B 1/38; B30B 1/18–1/181; B30B 9/00; B30B 15/041
USPC .................................................. 100/270–271
See application file for complete search history.

(56) References Cited

U.S. PATENT DOCUMENTS

| | | | | |
|---|---|---|---|---|
| 5,669,297 | A | * | 9/1997 | Verhoefen ............... B30B 1/106 100/257 |
| 6,116,139 | A | * | 9/2000 | Yuda, Jr. ................... F15B 9/12 91/451 |
| 6,993,837 | B2 | * | 2/2006 | Merz ....................... B23K 11/11 29/888.1 |
| 2007/0068399 | A1 | * | 3/2007 | Anderson ................ B30B 1/18 100/269.06 |
| 2010/0005639 | A1 | * | 1/2010 | Muller ................... B23P 19/02 29/256 |
| 2014/0245582 | A1 | | 9/2014 | Kim et al. |
| 2016/0074976 | A1 | * | 3/2016 | Moreau ................ B23P 11/025 29/428 |

FOREIGN PATENT DOCUMENTS

| | | |
|---|---|---|
| DE | 102013211702 A1 | 12/2014 |
| EP | 0462081 A1 | 12/1991 |
| JP | S6076931 A | 5/1985 |
| JP | 2000061749 A | 2/2000 |

OTHER PUBLICATIONS

English abstract for DE-102008064194, Jul. 1, 2010.
European Search Report for EP Application No. 16194634.8, dated Mar. 13, 2017.
English Abstract for JPS6076931A, May 1, 1985.
English Abstract for CH709379A1, Sep. 15, 2015.
English Abstract for EP0462081A1, Dec. 18, 1991.
English Abstract for DE102013211702A1, Dec. 25, 2014.

* cited by examiner

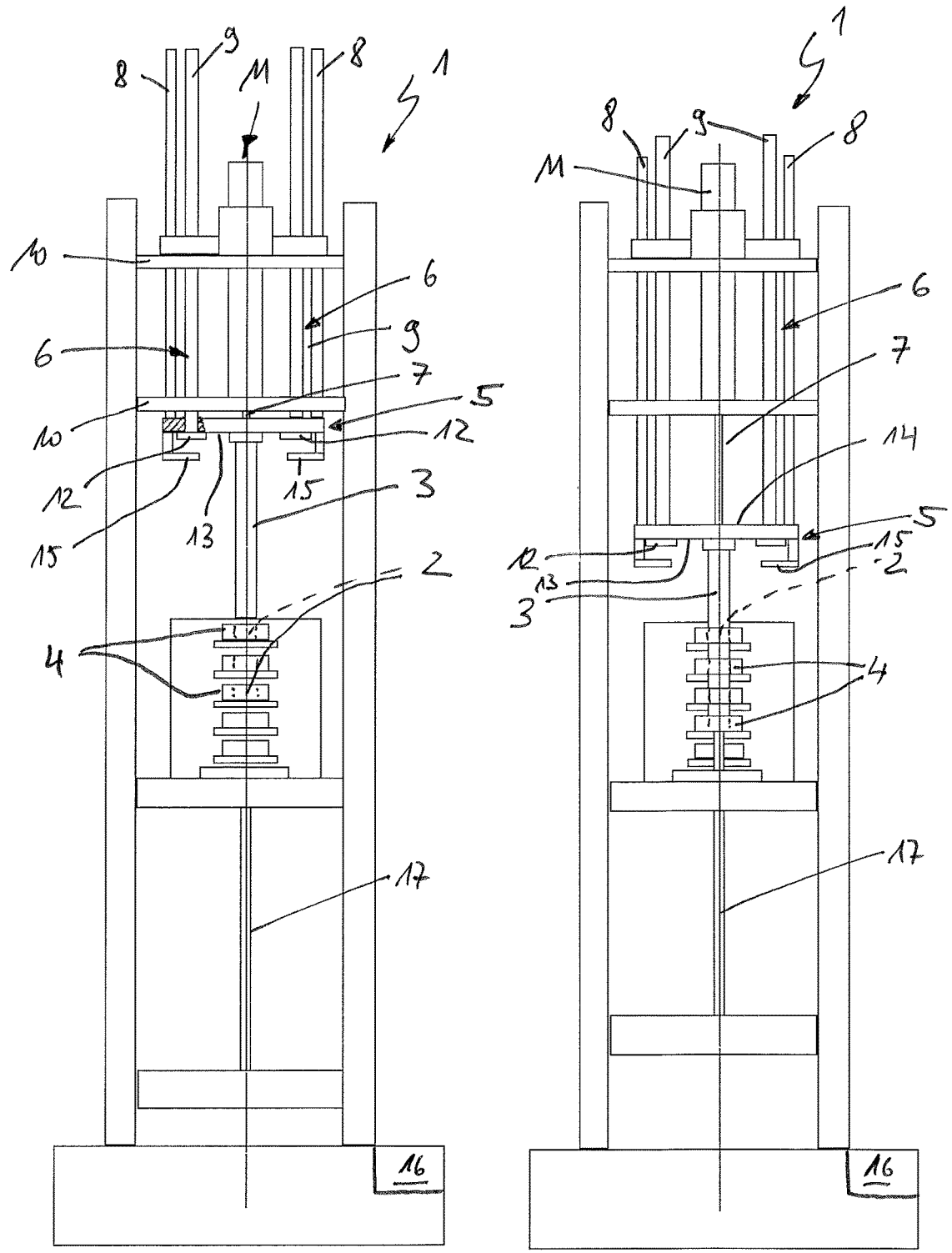

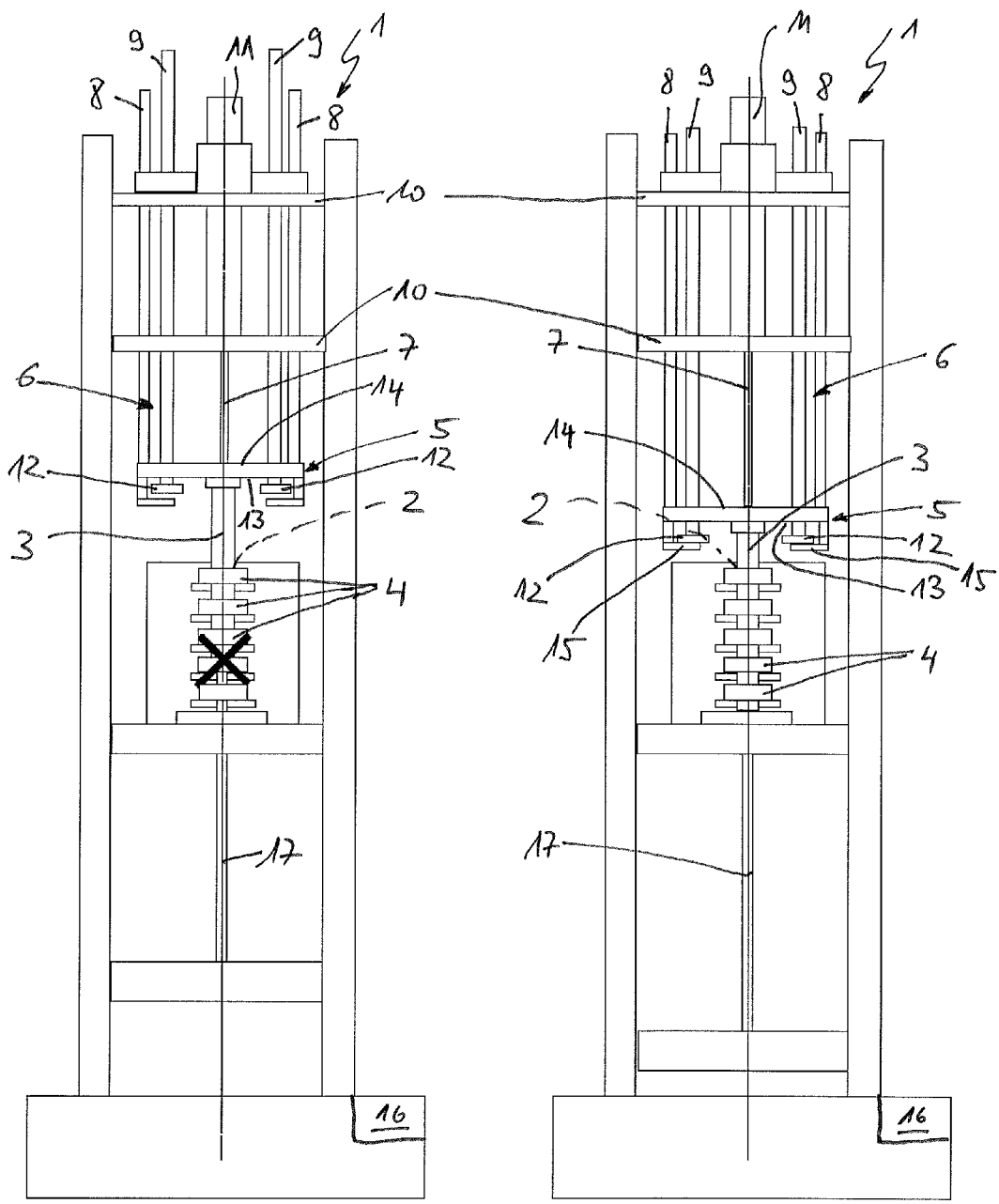

DEVICE FOR JOINTING A PLURALITY OF ELEMENTS ON A SHAFT

CROSS-REFERENCE TO RELATED APPLICATIONS

This application claims priority to German Patent Application No. DE 10 2015 220 981.4, filed on Oct. 27, 2015, the contents of which are hereby incorporated by reference in its entirety.

TECHNICAL FIELD

The present invention relates to a device for jointing a plurality of functional elements on a shaft, each functional element comprising a cutout for the shaft. The invention also relates to a method for jointing functional elements each comprising a cutout on a shaft using such a device.

BACKGROUND

In order to joint functional elements, in particular cams, on a shaft, in particular on a camshaft tube, the hubs or cutouts of the individual functional elements have to be aligned with the axis of the shaft. If a plurality of functional elements are to be jointed simultaneously in one go by introducing the shaft, all the functional elements must be correspondingly aligned.

A device suitable for this purpose for positioning a plurality of functional elements comprising a cutout for a shaft, in particular cams, in a predetermined angular position on the shaft is known from DE 10 2008 064 194 A1, wherein the device comprises a plurality of accommodation elements each intended for a functional element. The accommodation elements can be positioned such that the cutouts of the functional elements essentially lie on a common straight line.

A further device for positioning a plurality of functional elements comprising a cutout for a shaft, in particular cams, on the shaft is known from JP 2000-61749 A.

A drawback with the devices known from the prior art, however, is that they can usually perform either thermal jointing with comparatively little force or jointing of a press-fit with a comparatively high force.

SUMMARY

The present invention deals with the problem of providing a device for jointing a plurality of functional elements, comprising a cutout for a shaft, on the shaft, which device in particular makes a an assembly process more flexible.

According to the invention, this problem is solved by the subject-matter of the independent claims. Advantageous embodiments are the subject-matter of the dependent claims.

The present invention relates to the general idea of providing a device for jointing a plurality of functional elements, each comprising a cutout for a shaft, in a predetermined angular position on the shaft both with an electrical spindle drive, and also with a pneumatic piston for displacing a traversable guide carriage for the shaft, so that with this device both thermal jointing and the production of a press-fit is possible. By means of the traversable guide carriage for the shaft, the latter can be pushed from above through the cutouts of the functional elements. By means of the drives for the guide carriage which can be used independently of one another, a kind of hybrid device can thus be created, wherein for the thermal jointing, for example, solely the pneumatic piston is used to displace the guide carriage, whereas the electrical spindle drive is used for the production of a press-fit, for which a much greater expenditure force is required. With the device according to the invention, therefore, it is possible to produce both thermal jointing and also, insofar as is necessary, a press-fit, as result of which the device according to the invention is much more flexible in terms of its field of application than previous devices known from the prior art.

In an advantageous development of the solution according to the invention, the pneumatic piston is in contact with an upper side of the guide carriage and is designed to apply a maximum first press-in force. The electrical spindle drive comprises at least two spindles, which penetrate the guide carriage and which each comprise a spindle head at an underside of the latter. Moreover, the guide carriage comprises a stop contour in each case in the region of the two spindle heads, which stop contour is disposed spaced apart from the underside of the guide carriage and on which the spindles rest with their spindle heads if a second press-in force exceeding the first press-in force is required. With the device according to the invention, it is thus possible, for example, to perform a thermal joint fitting which requires a comparatively low press-in force or only an insertion force, wherein the maximum first press-in force made available by the pneumatic piston is no longer sufficient when a functional element is threaded on with a press-fit and in this case the preferably two spindles, which previously have moved uniformly with the pneumatic piston, continue to be rotated, so that they disengage from the underside of the guide carriage until they each lie against the respective stop contour and, via the latter, press the guide carriage and also the shaft further downwards. By means of the spindles, a second press-in force markedly exceeding the first press-in force can be applied relatively easily, said press-in force being required for example to produce a press-fit.

In an advantageous development of the invention, provision is made such that the pneumatic piston is in contact with an upper side of the guide carriage and is designed to apply a maximum first press-in force on the guide carriage. The electrical spindle drive comprises at least two spindles, which penetrate the guide carriage and each comprise a spindle head at the underside of the guide carriage. The electrical spindle drive can thus be traversed into a jointing end position and can serve as an end stop for the guide carriage. The stop contour naturally becomes unnecessary in this case. In this mode of operation, the spindles travel precisely to the subsequent end position and therefore ahead of the pneumatic piston and serve solely as an end stop. The guide carriage does not therefore rest on the spindle heads. The guide carriage is driven forward solely by the pneumatic piston and is switched off as soon as it reaches the end stop defined by the spindle heads which have travelled ahead. At this time, the maximum press-in force at the pneumatic cylinder is exceeded. This is therefore a failsafe end stop which can be adjusted dynamically, e.g. when two camshafts (hood modules) lying next to one another are jointed after one another and have different shaft end positions. In addition, the tolerance of the end position can thus be tracked dynamically when there is a change (thermal expansions etc.) in the system.

In an advantageous development of the solution according to the invention, at least two guide rods are provided for guiding the guide carriage, said guide rods running parallel to the spindles and parallel to the pneumatic piston. The guide carriage is thus guided not only by the at least two spindles, but also by the at least two guide rods, as result of which particularly precise guidance of the guide carriage and therefore also particularly precise introduction of the shaft into the cutouts of the functional elements can be achieved. The guide rods are fixedly connected to the guide carriage and guided vertically in a displaceable manner in at least one cross member of the device. Preferably, the guide rods are even guided vertically in a displaceable manner in two cross members of the device spaced apart from one another and disposed one above the other, as a result of which a particularly precise guidance can be achieved.

In a further advantageous embodiment of the solution according to the invention, a detection device is provided, which is constituted such that it switches off the device if the maximum first press-in force is exceeded and/or as soon as the spindle heads are disengaged from the underside of the guide carriage. If, for example, the device is to be used solely to produce a thermal joint connection between the functional elements and the shaft, such a detection device is of great advantage, since it immediately detects jamming of the shaft, for example in the case of an imprecise introduction of the shaft onto a cutout of a functional element, and then switches off the device. In the case of a thermal jointing, only a comparatively small press-in force or insertion force is usually required, so that blocking or jamming of the shaft is to be assumed in the event of the maximum first press-in force or insertion force required for this being exceeded. In order to prevent damage to the shaft and/or the functional elements, the detection device immediately switches off the device if the maximum first press-in force is exceeded and/or the guide carriage does not reach the end position. In the case of the maximum first press-in force capable of being exerted by the pneumatic piston on the guide carriage being exceeded, however, the two spindles continue to rotate, as a result of which their spindle heads are raised from the underside of the guide carriage. This raising could also lead to the device being switched off, for example via an electrical contact, since the detection device can for example immediately detect the disengagement of the spindle heads from the underside of the guide carriage, in particular by the opening of an electrical contact. In addition or alternatively, this can take place to monitor the first press-in force.

The present invention is also based on the general idea of providing a method for jointing functional elements each comprising a cutout on a shaft by means of the device described above for producing a control shaft, wherein the individual functional elements are first disposed vertically above one another and are aligned and fixed at least with respect to their rotation angle position. The arrangement of the individual functional elements takes place in such a way that their cutouts are usually disposed aligned with one another and enable an introduction of the shaft from above by means of the traversable guide carriage. The pneumatic piston displaces the guide carriage and the shaft disposed thereon until the maximum first press-in force is reached, whilst the spindles take over the further displacement of the guide carriage when the maximum first press-in force is exceeded, since their spindle heads are then disengaged from the underside of the guide carriage and are displaced further until they lie adjacent to the stops, and then take over, via the latter, the further pressing-in of the shaft into the functional elements, for example to produce a press-fit. With the device according to the invention, both the comparatively force-free production of a thermal joint fitting as well as the production of a press-fit, which requires much more force by comparison, is thus possible.

In an advantageous development of the method according to the invention, a detection device switches off the device if the maximum press-in force is exceeded and/or if the spindle heads disengage from the underside of the guide carriage. It is thus possible for example, in a comparatively straightforward manner, to ensure that in the case of a purely thermal jointing process, wherein only a comparatively small press-in force or insertion force is required, the device is immediately switched off if, for example, the shaft pushes against one of the functional elements or is jammed there. Since the pneumatic piston and the spindles move uniformly until the maximum first press-in force is reached, the spindle heads also remain at all times at an underside of the guide carriage in this region. If the maximum first press-in force capable of being applied by the pneumatic piston on the guide carriage is exceeded, the spindles continue to rotate, as result of which the spindle heads are disengaged from the underside of the guide carriage. In addition or as an alternative to the monitoring of the press-in force, this can bring about the disengagement of an electrical contact, which is detected by the detection device, after which the latter switches off the device. In particular, a thermal jointing process can thus be monitored in a particularly precise manner.

In an alternative embodiment of the method according to the invention, the detection device does not switch off the device if the maximum first press-in force is exceeded and/or if the spindle heads disengage from the underside of the guide carriage, so that the spindles in this case continue to rotate until they lie with their spindle heads against the respective stop. In this case, the spindles, with their spindle heads, continue to press the guide carriage via the stops up to a predefined maximum second press-in force and/or a predefined displacement path. Such a method is conceivable for example in a combined thermal jointing and pressing process, wherein both a thermal joint fitting as well as a press-fit on a further functional element is to be produced. If, for example, a series of functional elements is to be pressed onto a shaft by means of a thermal joint fitting and, for example, a functional element arranged at the very bottom by means of a press-fit, the device according to the invention first traverses the guide carriage through the functional elements to be jointed solely by means of a thermal joint fitting by means of the pneumatic piston, wherein in this region the spindles merely move uniformly with the pneumatic piston of the guide carriage, but without exerting force on the guide carriage. Once the shaft reaches the functional element arranged at the very bottom, which is to be jointed onto the shaft by means of a press-fit, the required press-in force increases abruptly and exceeds the maximum first press-in force capable of being applied by means of the pneumatic piston, after which the guide carriage stands still and the spindles continue to rotate. The latter continue to rotate until their spindle heads lie against the respective stops, in order then to press, via said stops, the guide carriage and the shaft farther down and into the functional element arranged at the very bottom. With such a method according to the invention and with the device according to the invention, therefore, combined jointing processes can be created comparatively easily.

Further important features and advantages of the invention emerge from the sub-claims, from the drawings and from the associated description of the figures with the aid of the drawings.

It is understood that the features mentioned above and those yet to be described below can be used not only in the combination stated in each case, but also in other combinations or in isolation without departing from the scope of the present invention.

Preferred examples of embodiment of the invention are represented in the drawings and will be explained in greater detail in the following description, wherein the same reference numbers relate to the same or similar or functionally identical components.

BRIEF DESCRIPTION OF THE DRAWINGS

In the figures, in each case diagrammatically,

FIG. 1 shows a device according to the invention for jointing a plurality of functional elements, each comprising a cutout for a shaft, on the shaft in an initial position, FIG. 2 shows a representation as in FIG. 1, but in a position in which the shaft is pushed at least partially into the functional elements and in which the guide carriage is displaced solely by means of a pneumatic piston, FIG. 3 shows a representation as in FIG. 2, but with a jamming of the shaft on the functional elements, FIG. 4 shows the device according to the invention in a state in which the shaft is displaced via the guide carriage solely by means of the spindle drive.

DETAILED DESCRIPTION

Corresponding to FIGS. 1 to 4, device 1 according to the invention for jointing a plurality of functional elements 4 each comprising a cutout 2 for a shaft 3, for example cams, balancing masses, gearwheels and/or bearings, in a predetermined angular position on shaft 3, comprises a traversable guide carriage 5 for shaft 3, by means of which shaft 3 can be pushed from above through cutouts 2 of functional elements 4 disposed vertically one above the other. According to the invention, an electrical spindle drive 6 and a pneumatic piston 7 are provided for displacing guide carriage 5 and therefore also for displacing shaft 3. Guide carriage 5 can thus be displaced optionally by means of pneumatic piston 7 or spindle drive 6.

In addition, at least two guide rods 8 are provided for guiding guide carriage 5, which run parallel to spindles 9 of spindle drive 6 and parallel to pneumatic piston 7. Guide rods 8 are fixedly connected to guide carriage 5 and are guided vertically in a displaceable manner in at least one, here two cross members 10 of device 1, said cross members being arranged one above the other, as a result of which particularly precise guidance of guide carriage 5 and therefore also particularly precise guidance of shaft 3 is enabled.

If guide carriage 5 of device 1 according to the invention is examined more closely, it can be seen that pneumatic piston 7 is in contact with an upper side 14 of guide carriage 5, wherein pneumatic piston 7 is also designed to apply a maximum first press-in force or insertion force. Electrical spindle drive 6 comprises an electric motor 11, by means of which the two spindles 9 of spindle drive 6 are driven. The two spindles 9 of spindle drive 6 penetrate guide carriage 5 and each comprise a spindle head 12 at an underside 13 of guide carriage 5. Guide carriage 5 itself comprises, in the region of the two spindle heads 12, in each case a stop contour 15, which is arranged spaced apart from underside 13 of guide carriage 5 and on which the two spindles 9 rest with their respective spindle heads 12 if a second press-in force exceeding the first press-in force is required. Stop contours 15 or the stops are constituted as hook contours or pots.

Generally, spindle heads 12 of spindles 9 can also serve as end stops, wherein in this case pneumatic piston 7 is in contact with an upper side 14 of guide carriage 5 and is designed to apply a maximum first press-in force onto guide carriage 5. Electrical spindle drive 6 comprises at least two spindles 9, which penetrate guide carriage 5 and each comprise a spindle head 12 at an underside 13 of guide carriage 5. Electrical spindle drive 6 can be traversed into a jointing end position and can serve as an end stop for guide carriage 5. In this case, stop contour 15 is of course not required. In this mode of operation, spindles 9 travel precisely to the subsequent end position and therefore ahead of pneumatic piston 7 and serve merely as an end stop. Guide carriage 5 does not therefore rest on spindle heads 12. Guide carriage 5 is driven forward solely by means of pneumatic piston 7 and is switched off as soon as it reaches the end stop defined by spindle heads 12 which have travelled ahead. At this time, the maximum press-in force at pneumatic piston 7 is exceeded. This is therefore a failsafe end stop which can be adjusted dynamically, e.g. if two camshafts (hood modules) lying beside one another are jointed one after the other and have different shaft end positions. The tolerance of the end position can thus also be tracked dynamically when there is a change (thermal expansions etc.) in the system.

In addition, a detection device 16 can be provided, which is constituted such that it switches off device 1 if the maximum first press-in force of pneumatic piston 7 is exceeded and/or if spindle heads 12 in spindle 9 disengage or are raised from underside 13 of guide carriage 5. This can be detected comparatively simply, for example by the opening of an electrical contact, whilst the maximum first press-in force can be monitored for example by means of a suitable sensor. Such a detection device 16 is particularly advantageous if only a thermal jointing of functional elements 4 on shaft 3 is to take place with device 1 according to the invention, for which only a comparatively small press-in force is usually required. If the maximum first press-in force required for this is exceeded, for example triggered by jamming of shaft 3 on one of function elements 4, as is represented in FIG. 3, this leads not only to the maximum first press-in force being exceeded, but also, due to the continuing rotation of the two spindles 9, to a raising of their spindle heads 12 from underside 13 of the guide carriage. The two effects can be monitored cumulatively or alternatively. Since such jamming of shaft 3 on functional elements 4 could lead to damage, detection device 16 in this case switches off device 1. Up to such jamming, a displacement of guide carriage 5 and therefore also a displacement of shaft 3 takes place solely by means of pneumatic piston 7, which is part of a pneumatic piston-cylinder unit, whilst spindles 9 of spindle drive 6 merely rotate uniformly at the same time without applying any force. In this case, therefore, spindle heads 12 of spindles 9 always lie against underside 13 of guide carriage 5, as is represented for example according to FIG. 2. The covered displacement path of spindles 9 and of pneumatic piston 7 must be identical.

In the situation represented according to FIG. 3, in which for example jamming of shaft 3 on one of functional elements 4 may be involved, detection device 16 can thus switch off device 1 in order to prevent damage. It is however also conceivable here that in this case it does not involve jamming, but that one of lower functional elements 4 is to be jointed, in addition to or as an alternative to thermal jointing, by means of a press-fit with shaft 3, for which greater forces are of course required. In this case, detection device 16 would not switch off device 1, so that spindles 9 continue to rotate until their spindle heads 12 lie against stop contours 15 (see FIG. 4) and, via said stop contours, can bring about a further introduction of force and a further displacement of shaft 3. Such a spindle drive 6 enables the application of much greater press-in forces than pneumatic piston 7. The jamming of shaft 3 or the reaching of functional element 4 to be jointed with a press-fit is denoted in FIG. 3 by a bold cross.

To guide shaft 3, use can of course also be made of a centering rod 17 with, for example, a centering tip, which is introduced into the usually tubular shaft 3.

With device 1 according to the invention, it is thus possible for the first time to create a hybrid device which, by means of two different drive systems, on the one hand that in pneumatic piston 7 and on the other hand in spindle drive 6, can bring about a displacement of guide carriage 5 with different press-in forces. The field of application of such a device 1 is therefore much broader than in the case of devices known hitherto from the prior art.

The invention claimed is:

1. A device for jointing a plurality of elements, each having a cutout for a shaft, in a predetermined angular position on the shaft, comprising:
    a traversable guide carriage configured to push the shaft from above through the cutouts of the elements; and
    an electrical spindle drive and a pneumatic piston for displacing the traversable guide carriage,
    wherein the pneumatic piston is configured to contact an upper side of the traversable guide carriage, and the electrical spindle drive is configured to penetrate the traversable guide carriage, and
    wherein the traversable guide carriage includes stop contours spaced apart from an under side of the traversable guide carriage, the electrical spindle drive includes two spindles, and the two spindles are configured to rest on the stop contours.

2. The device according to claim 1, wherein:
    the pneumatic piston is configured to apply a maximum first press-in force on the traversable guide carriage;
    the spindles penetrate the traversable guide carriage, and include respective spindle heads at the under side of the traversable guide carriage; and
    the electrical spindle drive serves as an end stop for the traversable guide carriage.

3. The device according to claim 2, further comprising at least two guide rods for guiding the traversable guide carriage, the guide rods running parallel to the two spindles and parallel to the pneumatic piston.

4. The device according to claim 3, further comprising at least one cross member, wherein the guide rods are fixedly connected to the traversable guide carriage and guided vertically in a displaceable manner in the at least one cross member.

5. The device according to claim 2, wherein the a stop contours are in a region of the spindle heads, and on which the respective spindle heads rest if a second press-in force exceeds the first press-in force.

6. The device according to claim 5, wherein the stop contours are one of hook contours and pots.

7. The device according to claim 1, wherein:
    the pneumatic piston is configured to apply a maximum first press-in force;
    the two spindles penetrate the traversable guide carriage, and include respective spindle heads at the under side of the traversable guide carriage; and
    the stop contours are in regions of the spindle heads of the two spindles, and on which the respective spindle heads rest if a second press-in force exceeds the first press-in force.

8. The device according to claim 1, wherein the stop contours are one of hook contours and pots.

9. The device according to claim 1, further comprising a detector including a sensor configured to monitor an electrical contact and switch off the device if at least one of a maximum first press-in force is exceeded and if the traversable guide carriage does not reach an end position.

10. The device according to claim 9, wherein the electrical contact is between the traversable guide carriage and at least one of the spindles of the electrical spindle drive.

11. The device according to claim 1, further comprising at least two guide rods for guiding the traversable guide carriage, the guide rods running parallel to the spindles and parallel to the pneumatic piston.

12. The device according to claim 11, further comprising at least one cross member, wherein the guide rods are fixedly connected to the traversable guide carriage and guided vertically in a displaceable manner in the at least one cross member.

13. A device for jointing a plurality of elements, each having a cutout for a shaft, in a predetermined angular position on the shaft, comprising:
    a traversable guide carriage configured to push the shaft from above through the cutouts of the elements; and
    an electrical spindle drive and a pneumatic piston for displacing the traversable guide carriage,
    wherein the pneumatic piston is in contact with an upper side of the traversable guide carriage and is configured to apply a maximum first press-in force on the traversable guide carriage,
    the electrical spindle drive includes at least two spindles, which penetrate the traversable guide carriage and which each has a spindle head at an underside of the traversable guide carriage, and
    the electrical spindle drive serves as an end stop for the traversable guide carriage.

14. The device according to claim 13, wherein the traversable guide carriage includes stop contours that are one of hook contours and pots.

15. The device according to claim 13, further comprising a detector including a sensor configured to monitor an electrical contact and switch off the device if at least one of a maximum first press-in force is exceeded and if the traversable guide carriage does not reach an end position.

16. The device according to claim 15, wherein the electrical contact is between the traversable guide carriage and at least one of the at least two spindles of the electrical spindle drive.

17. A device for jointing a plurality of elements, each having a cutout for a shaft, in a predetermined angular position on the shaft, comprising:
    a traversable guide carriage configured to push the shaft from above through the cutouts of the elements; and
    an electrical spindle drive and a pneumatic piston for displacing the traversable guide carriage,
    wherein the pneumatic piston is in contact with an upper side of the traversable guide carriage and is configured to apply a maximum first press-in force,
    the electrical spindle drive includes at least two spindles, which penetrate the traversable guide carriage and which each has a spindle head at an underside of the traversable guide carriage, and the traversable guide carriage includes stop contours in regions of the spindle heads of the at least two spindles, the stop contours being disposed spaced apart from the underside of the traversable guide carriage and on which the two spindles rest with their spindle heads if a second press-in force exceeds the first press-in force.

18. The device according to claim 17, wherein the stop contours are one of hook contours and pots.

19. The device according to claim 17, further comprising a detector including a sensor configured to monitor an electrical contact and switch off the device if at least one of a maximum first press-in force is exceeded and if the traversable guide carriage does not reach an end position.

20. The device according to claim 19, wherein the electrical contact is between the traversable guide carriage and at least one of the at least two spindles of the electrical spindle drive.

* * * * *